May 25, 1937.  W. I. JONES  2,081,870
RESILIENT FASTENING MEANS
Filed Aug. 16, 1934

Inventor:
Walter I. Jones

Patented May 25, 1937

2,081,870

UNITED STATES PATENT OFFICE 2,081,870

RESILIENT FASTENING MEANS

Walter I. Jones, Arlington, Mass., assignor to United-Carr Fastener Corporation, Cambridge, Mass., a corporation of Massachusetts Application August 16, 1934, Serial No. 740,084

8 Claims. (Cl. 24—73)

My invention relates to a novel form of fastener-secured winter front cover for automobile radiators and novel fasteners for the same.

In the drawing which illustrates a preferred form of my invention:—

The object of my invention is to provide a flexible cover for the radiators of automobiles that may be used in cold weather to prevent freezing of the cooling liquid and to allow the engine to heat up to proper temperature more rapidly. For some time it has been the practice of automobile manufacturers to provide their cooling systems with thermostats which do not allow the liquid to circulate in the radiator until the engine is warm. Obviously, then, if a motor is started and run in cold weather the danger of freezing the cooling liquid when first starting out is greatly increased, since the water in the radiator is exposed to a steady stream of cold air. Furthermore, with the advent of radiator grilles on the more modern motor vehicles, it is difficult to attach a cardboard or flexible cover to the grille because the rear side is inaccessible. Therefore the types of fastening members used to attach covers directly to the radiators are not usuable, at least not conveniently, as fastening means for radiator grille covers. My invention provides a flexible cover which may be attached to the radiator grille by simple snap fasteners easily and quickly, and which may be adjusted, on many types of cars, to cover more or less surface as desired without removing the fasteners.

Figure 1:
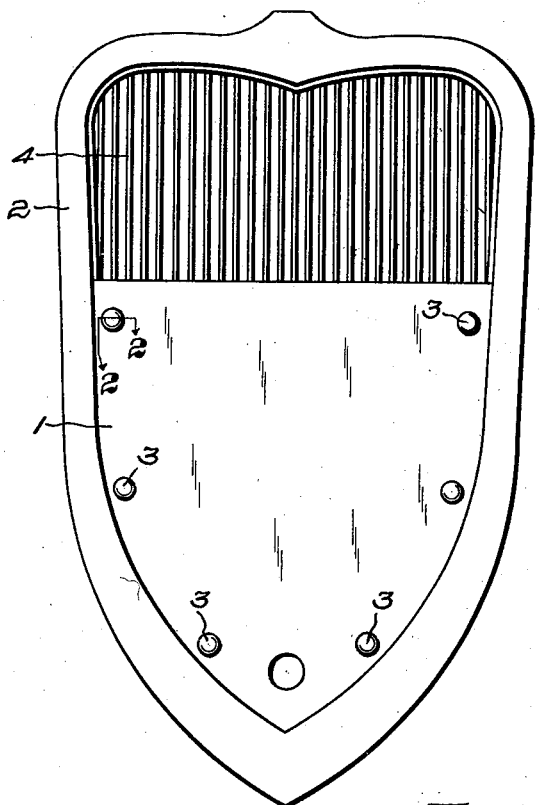
Figure 1 is a front view of a complete installation showing the use of my novel fasteners.
Figure 2:
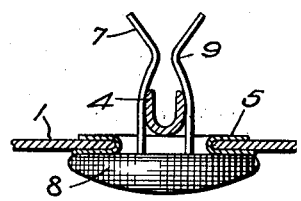
Fig. 2 is an enlarged section taken on the line 2—2 of Fig. 1.
Figure 3:
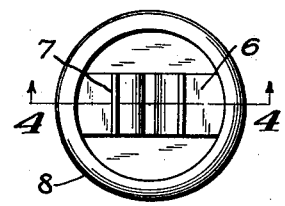
Fig. 3 is an enlarged end view of a form of my novel fastener.
Figure 6:
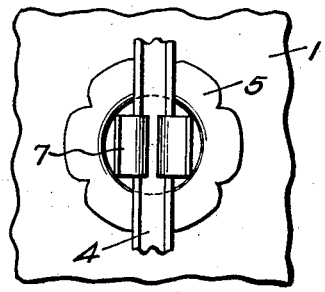
Fig. 6 is an enlarged rear view of a fragment of the installation shown in Fig. 1, including one fastener and support, and the adjacent part of the cover.

Referring now to the accompanying drawing, I have shown a flexible cover 1 cut to the proper shape and covering as much of the radiator as is desired. This cover may be made of any suitable material such as waterproofed canvas or imitation leather such as is used in motor vehicle tops. Securing this cover 1 to the grille 2 are a plurality of fasteners 3, which are located in apertures in the cover and engage the underlying bars 4 of the grille, as best shown in Figs. 2 and 6. I have also provided a grommet 5 to reinforce the apertures in the cover.

Figure 4:
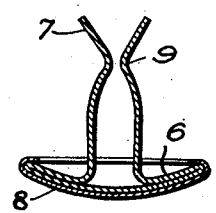
Fig. 4 is a section taken on the line 4—4 of Fig. 3.
Figure 5:
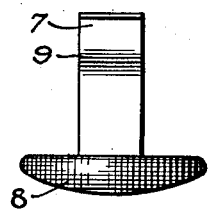
Fig. 5 is a side view of the fastener shown in Figs. 3 and 4.

Proceeding now to the fastener itself, I have shown a simple and strong fastener made from a single piece of spring metal. This fastener is easily engaged with the grille bars and is slidable thereon by virtue of its spring grip and its flat engaging arms. The specific form illustrated is formed by bending a strip of flat spring steel or other suitable material in the shape shown in Fig. 4. It has a head portion 6 and a pair of yieldable arms 7 extending from the head and formed by bending portions of the free ends of the strip until they lie along one face of the head for a short distance as shown in Fig. 4. The ends of the strip are then bent directly away from the head in substantially parallel planes. Towards their ends they are bent toward each other in gradually increasing curves until they are very close together and then bent sharply away from each other at their extremities. A cap 8 is attached to the head for the purpose of providing a better appearance and also to make the fastener easier to handle. The sloping shoulders 9 formed by bending the arms as described above are shaped on their sides nearest the head so that they may be used on bars of various cross-sections. The V-shaped opening beyond the points of the shoulders provides a pair of cams which are adapted to spread the arms when the fastener is being engaged with a bar.

The arms, when formed as described above, securely grip the supporting bar, yet the fastener may be slid along the bar without removing it from the bar. The grip is strong enough, however, to prevent the cover from slipping out of place of its own accord.

Referring again to the installation as a whole, I prefer to place the apertures in the cover in pairs at opposite sides of the cover near its edge. Thus the top section may be slid downwards, or the bottom section may be moved up towards the top by simply moving the proper pair of fasteners.

I have used a particular installation to describe the use and construction of my novel fastener, but it should be understood that there are other forms and uses therefor and I do not wish to be limited by such description since the scope of my invention is best defined by the following claims.

I claim:

1. Fastener means for use with an apertured flexible shield for attachment to the front of motor radiator grilles having relatively rigid bars formed with spaced substantially flat sides, said fastener means having a part in the form of a relatively rigid head bearing on the shield and grille-engaging arms extending directly from said head through an aperture in said shield and engaging said grille bars with a spring action to securely hold the shield to the supporting grille, said grille engaging arms being substantially straight and parallel for the major portion of their length whereby to frictionally engage the relatively flat sides of the grille bars to be supported thereby.

2. Fastener means for use with an apertured flexible shield for attachment to the front of motor radiator grilles having relatively rigid bars, said fastener means having shield-engaging means, and a pair of yieldable spring arms extending from said shield-engaging means past an adjacent grille-bar, at opposite sides thereof, each of said arms approaching each other around said grille bar to securely hold the shield in place upon the grille, the portion of said spring arms between the shield engaging means and said offset portion being of greater length than the spacing between the spring arms to permit said arms to embrace grille bars of various depths.

3. Fastener means for use with an apertured shield for attachment to the front of motor radiator grilles having relatively rigid bars, said fastener means having an enlarged relatively rigid head adapted to overlie and engage the portion of the shield surrounding the apertures thereof and a grille clamping means extending through the apertures of the shield, said last named means including a pair of spaced spring arms substantially flat and parallel for the major portion of their length terminating adjacent one end in converging portions adapted to engage a grille bar and to be frictionally supported thereby.

4. A fastener of the class described formed from a single strip of spring metal of considerably greater width than thickness, said fastener having an elongated head portion with folded end portions, a pair of flat yieldable arms extending in parallel planes from the inner ends of said folded portions directly away from said head in spaced relationship, said arms converging from their parallel planes toward a common point spaced from said head and subsequently diverging therefrom to form a pair of outwardly disposed shoulders for the purpose of engaging a supporting structure between said arms, and a relatively stiff cap member secured to said head.

5. A fastener for use with a flexible apertured shield formed from a strip of spring metal of considerably greater width than thickness, said fastener having an elongated head formed from the mid-portion of said strip, the portions of said strip adjacent to the ends of said head being folded under said head whereby the ends of said head are of double the thickness of the metal for a predetermined distance toward the center thereof, a pair of opposed spring arms extending directly from said head at the inner ends of said folded portions, at least one of said arms having a portion extending toward the other to provide fastener-retaining means for engagement with a rigid supporting bar and the free ends of said arms diverging from such point to provide surfaces for wedging the arms apart when the bar is entered between said diverging portions, and a shield engaging cap member embracing at least a portion of said head.

6. Fastener means for use with a shield for attachment to the front of a motor radiator grille having relatively rigid bars formed with spaced substantially flat sides, said fastener means having an elongated grille-engaging portion for frictional fastening engagement with the flat sides of at least one of the grille bars, a yieldable portion for acting upon said grille-engaging portion to hold it in place against accidental disengagement from said grille and said fastener means having shield-engaging means operable to hold the shield in position against the front of the grille.

7. Fastener means for use with an apertured shield for attachment to the front of motor radiator grilles having relatively rigid bars, said fastener means having shield-engaging means, and a pair of yieldable spring arms extending from said shield-engaging means past an adjacent grille-bar, at opposite sides thereof, each of said arms approaching each other around said grille bar to securely hold the shield in place upon the grille, the spacing between said spring arm with relation to the size of the shield aperture being such that said pair of arms may be passed loosely through said shield aperture without contraction whereby said fastener is held in place solely by the clamping action with said grille bar.

8. Fastener means for use with an apertured flexible shield adapted for attachment to the front of motor radiator grilles having relatively rigid bars, said fastener means including a relatively stiff member engaging said shield throughout a substantial area surrounding an aperture therein, a grille engaging member comprising spaced substantially flat resilient arms adapted to embrace and frictionally engage the sides of the grille bar to be supported thereby and means extending through the aperture of said shield for connecting the grille engaging member to said stiff member.

WALTER I. JONES.